INVENTORS
SIDNEY S. WAYNE
BENJAMIN J. ALECK
BY Hubbell, Cohen, Stiefel & Fiddler
ATTORNEYS.

INVENTORS
SIDNEY S. WAYNE
BENJAMIN J. ALECK
BY Hubbell, Cohen, Stiefel + Fiddler
ATTORNEYS.

Sept. 5, 1967 S. S. WAYNE ETAL 3,339,803

FLUID STORAGE AND EXPULSION SYSTEM

Filed March 5, 1965 6 Sheets-Sheet 3

INVENTORS
SIDNEY S. WAYNE
BENJAMIN J. ALECK
BY Hubbell, Cohen, Stiefel & Fiddler
ATTORNEYS.

Sept. 5, 1967 S. S. WAYNE ETAL 3,339,803
FLUID STORAGE AND EXPULSION SYSTEM
Filed March 5, 1965 6 Sheets-Sheet 4

INVENTORS
SIDNEY S. WAYNE
BENJAMIN J. ALECK
BY Hubbell, Cohen,
Stiefel & Fiddler
ATTORNEYS.

Sept. 5, 1967 S. S. WAYNE ETAL 3,339,803

FLUID STORAGE AND EXPULSION SYSTEM

Filed March 5, 1965 6 Sheets-Sheet 5

INVENTORS
SIDNEY S. WAYNE
BENJAMIN J. ALECK
BY Hubbell, Cohen
Stiefel & Fiddler
ATTORNEYS.

INVENTORS
SIDNEY S. WAYNE
BENJAMIN J. ALECK
BY Hubbell, Cohen & Stiefel
ATTORNEYS.

United States Patent Office
3,339,803
Patented Sept. 5, 1967

3,339,803

FLUID STORAGE AND EXPULSION SYSTEM

Sidney S. Wayne, Englewood, N.J., and Benjamin J. Aleck, Jackson Heights, N.Y., assignors, by mesne assignments, to Arde, Inc., Paramus, N.J., a corporation of Delaware Filed Mar. 5, 1965, Ser. No. 437,458
17 Claims. (Cl. 222—95)

This invention relates to a fluid storage and expulsion system and especially to a fluid storage and expulsion system utilizing a thin liner which moves from one end of the storage tank to the opposite end in order to force the out of the tank.

The use of bladder-type storage and expulsion systems is known in the prior art. Generally, such storage and expulsion systems include a spherical tank having an inlet and an outlet and a hemispherical liner disposed within the tank and conforming to the inner surface of the hemisphere surrounding the inlet. With fluid in the chamber defined by the liner and the uncovered portion of the tank, when a pressure differential is applied to the liner, the liner commences to collapse and move toward the outlet to thereby force the fluid within the chamber of the outlet.

A number of difficulties have been encountered with such a system. The major difficulty has been that often times when a pressure differential is applied to the liner, instead of the liner exhibiting an organized line collapse movement from a condition in which it conforms to one hemisphere to a condition in which it conforms to the opposed hemisphere to thereby give a complete expulsion of fluid within the chamber, the liner buckles in a disorganized fashion and folds to thereby snag on itself and prevent an orderly expulsion of fluid. Further, such buckling and folding often causes the formation of pinholes in the liner, which pinholes result in leakage and failure of the expulsion system.

It is therefore an object of the present invention to provide a new and improved storage and expulsion system of the type described.

A further object of the present invention is the provision of a new and improved expulsion system of the type described wherein the liner is so designed and constructed that it will exhibit an orderly line collapse in moving from conforming with one portion of the storage tank to conforming with the opposed portion thereof.

Another object of the present invention is the provision of a new and improved expulsion system of the type described wherein the liner is so designed that it will exhibit an orderly line collapse movement under pressure differential without any disorganized buckling and folding of the liner.

The above and other objects, characteristics and features of the present invention will be more fully understood from the following description taken in connection with the accompanying illustrative drawings.

Figure 1:
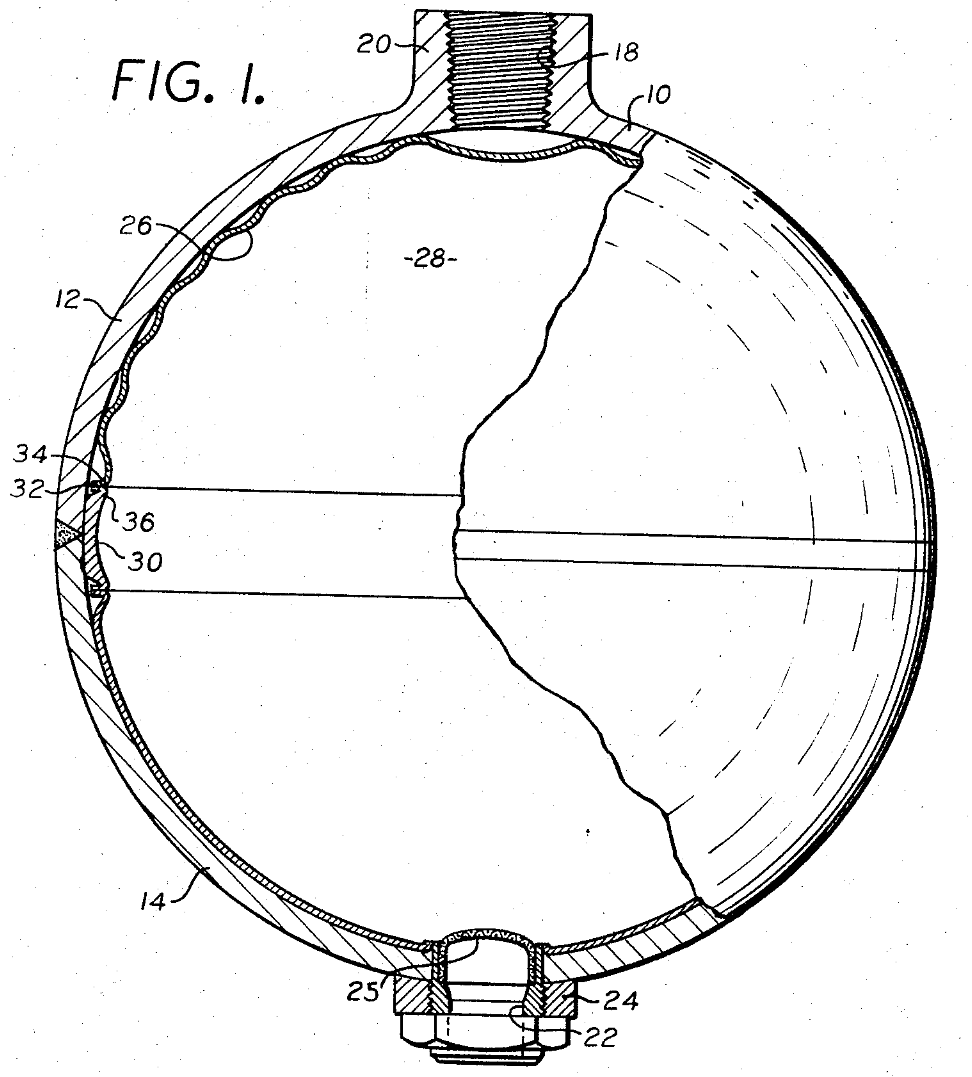
FIG. 1 is a view partly in section and partly in elevation of a spherical storage and expulsion system of the type described.

Referring now to FIG. 1 of the drawing, a storage-expulsion device is shown therein comprising a spherical shell or casing 10 made of an upper hemisphere 12 and a lower hemisphere 14 joined together as by welding or brazing 16 although other types of junctions can be employed. The upper hemisphere 12 has at its top an inlet 18 through a hollow boss 20. The lower hemisphere 14 as an outlet 22 through a boss 24, the outlet being covered by an outlet screen 25. Secured to the interior of the shell 10 in a manner to be described subsequently in this specification, is a collapsible liner 26 here shown to be corrugated for reasons which will be become apparent hereinafter. The liner 26 may be made of any suitable fluid impervious material such as metal or plastic. For example, the liner may be made of stainless steel. However, polyester film, nylon film, polytetrachloroethylene film, aluminum foil or other similar film-like materials may be employed depending upon the fluid to be stored and expelled. For example, if cryogenic fluids are to be stored and expelled from the device, the plastics are generally not suitable as a liner since they lose ductility at cryogenic temperatures. At such temperatures the metals are far preferable. For example, SAE304 Stainless Steel is highly desirable.

In general, fluid is stored in the chamber defined by the inner surface of the lower hemisphere 14 and the inner surface of the liner 26 which is in close confronting relation with the inner surface of the upper hemisphere 12, this chamber being generally designated by the reference numeral 28. With fluid stored in the chamber 28, if pressure is applied at the inlet 18, it is intended that the liner 26 collapse downwardly towards the outlet 22 to expel the fluid in the chamber 28 through the outlet 22. It is in this manner that the device operates.

The present invention is directed towards configurations of the liner 26 which will permit an orderly collapse of the liner from the top adjacent inlet 18 towards the bottom so as to prevent folding or creasing of the liner during the collapse, which folding or creasing, as already noted, results in the formation of pinholes.

We have discovered that when a liner 26 is subjected to a pressure differential it exhibits two forms of tendency to callapse. The first is a flexural form wherein the liner rolls in on itself about latitudinally extending circles as may best be seen in FIG. 3, wherein the numbers 0, 1, 2, 3, 4, 5 and 6 show the progression of the liner 26 from a fully uncollapsed condition to a fully collapsed condition. The pressure differential necessary to cause such a yielding will hereinafter be designated as $P_y$. The other form of collapse exhibited by a liner, namely uncontrolled buckling, is in the nature of the buckling of a column. The pressure value needed to effectuate such buckling, hereinafter designated as $P_{cr}$, is dependent upon different parameters than is $P_y$. Accordingly, in the present invention the liner is designated so that $P_y$ is always less than $P_{cr}$ whereby to insure that line collapse will always occur first and thereby prohibit uncontrolled buckling.

Figure 2:
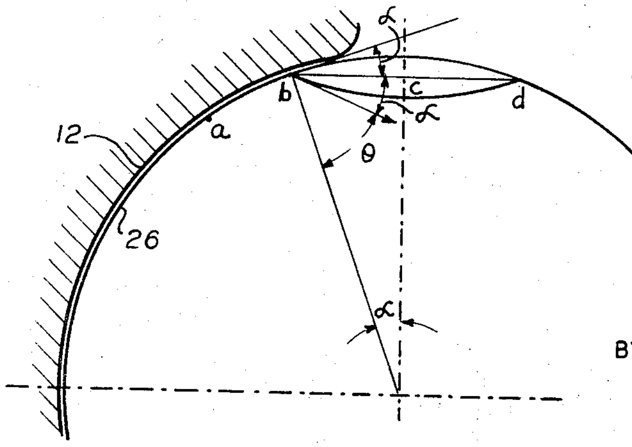
FIG. 2 is a schematic diagram of a portion of the expulsion and storage device of FIG. 1 to facilitate understanding of the theoretical considerations of the present invention.

The manner of achieving this desirable type of line collapse action is explained in connection with the diagram forming FIG. 2 of the drawings. Referring to FIG. 2, analysis will be made with respect to a section of the liner designated by the reference character *ab*. Further, let it be accumed that the latitude circle *c* is adjacent the dimple *bd* and the liner 26, which dimple is provided for reasons which will become apparent hereinafter. The dimple or dished out section *bd* of the liner joins the section *ab* at an angle which is designated by the reference $\phi$ in FIG. 2. Assuming a pressure differential is applied to the bladder through the inlet 18, which pressure differential is equal to P, a shear force $V_o$ will act on the element *ab* of the liner 26 which shear force will be equal to $PR/2 \cos \phi$ in which R is the radius of the liner. In evaluating the effect of $V_o$, it is adequate as an approximation, to use its effect on a cylinder of radius R. Therefore, the maximum bending moment ($M_{max.}$) may be stated as $$M_{max.} = 0.322 \frac{V_0}{B} \quad (1)$$

where $$B = 4\sqrt{\frac{3(1-\nu_2)}{R^2 t^2}} = \frac{1.285}{\sqrt{R\,t}} \quad (2)$$

$R$=radius of curvature to wall
$\nu$=Poisson's ratio=.3 and
$t$=thickness of liner.

Combining Equations 1 and 2 and substituting for $V_o$ we get $$M_{max.} = \frac{0.322 \frac{PR}{2} \cos \phi}{\frac{1.285}{\sqrt{Rt}}} \quad (3)$$

Assuming the section to be uniformly at the yield stress, the bending moment at the yield point ($M_y$) is given by the following formula:

$$M_y = \frac{1}{4}\sigma_y t^2 \quad (4)$$

where $\sigma_y$=the yield stress in p.s.i.

By equating $M_{max.}$ and $M_y$, an expression for the critical differential pressure $P_y$ required to cause flexural yielding at a point on section *ab* may be achieved. This formula for $P_y$ is given as $$P_y = \frac{2\sigma_y}{\sqrt{\left(\frac{R}{t}\right)^3} \cos \phi} \quad (5)$$

substituting $(90° - 2\alpha)$ for $\phi$, it will be seen that $$P_y = \frac{2\sigma_y}{\left(\frac{R}{t}\right)^{3/2} \sin 2\alpha} = k \csc 2\alpha \quad (6)$$

where $$k = \frac{2\sigma_y}{\left(\frac{R}{t}\right)^{3/2}}$$

Thus the pressure digerential required to yield any section of the liner disposed at an angle $\alpha$ in order to cause that section to fold inwardly and become part of the dished out or dimpled section can be calculated. Such a calculation will show that $P_y$ is infinite when $\alpha=0°$, and $P_y$ drops rapidly until it achieves a fairly low value at 10 to 15°, and then continues to drop gradually until 45° where it reaches a minimum and thereafter commences to increase in a symmetrical fashion so that $P_y$ at an angle $\alpha$ of 90°, $P_y$ is once again infinite. For example, with a liner or diaphragm having a radius R of 1.93 inches and a thickness of .005 inch, and assuming that the yield stress $\sigma_y$ equals 35,000 p.s.i., the following values of the yield pressure $P_y$ in p.s.i. can be calculated with respect to various angular locations on the liner as shown in Table 1.

*Table 1*

| Angle, degrees: | P yield, p.s.i. |
|---|---|
| 0 | ∞ |
| 3 | 87.2 |
| 5 | 52.5 |
| 10 | 26.7 |
| 15 | 18.2 |
| 20 | 14.20 |
| 30 | 10.5 |
| 45 | 9.1 |
| 60 | 10.5 |
| 90 | ∞ |

As previously noted the yield pressure necessary to produce line collapse of the vessel is extremely high at the top of the liner (0°) and at the lower edge of the liner (90°). These yield pressures ($P_y$) are theoretically infinite whereby to result in it being impossible for $P_y$ to be less than $P_{cr}$ in these vicinities. In order to overcome this difficulty and insure a line collapse throughout the entire action of the liner, two expedients are resorted to. In the 0° area, the liner is not contoured to conform to the general hemispherical shape hereinbefore discussed. Instead, the liner in the 0° area is provided with a dished out portion or dimple the shape of which would conform to the shape of that portion of the liner had it gone through the desired line collapse. The extent of the dimple, that is the area *bd*, is a matter of design choice. However, it has been found that a practical location for the point *b*, that is the extent of the angle $\alpha$, is about 3°. At this point $P_y$, as calculated for the hemispherical liner hereinbefore discussed as an example is 87.2 p.s.i. which is measurably below $P_{cr}$ at that point in a properly corrugated or otherwise stiffened liner as will be discussed subsequently.

In the 90° area along the lower edge of the liner 26, it has been found that an excellent way to eliminate the problem of infinite $P_y$ is to offset the liner from the equator of the vessel by a few degrees, for example 3°, and to connect the liner to an attachment ring 30 which extends above and below the equator of the vessel approximately 3°. The lower edge 32 of the liner may be welded or soldered or otherwise connected to the upper edge of the attachment ring and may be preformed with a round band 34 of sufficient radius to maintain fairly low bending strains at this point. At the same time the upper edge of the attachment ring is provided with a rounded corner 36 so that when the liner collapses, it will conform to the radius of the rounded corner 36 which is of sufficient extent to again maintain the bending strain within reasonable limits.

With the lower edge of the liner upwardly offset to eliminate the problem of excessive yield pressure in the vicinity of the equator or diametral plane of the vessel, the liner when it is collapsed in an unstretched condition will not conform to the liner surface of the lower hemisphere of the vessel, that is the surface 28. Thus, in order to achieve substantially 100% expulsion, it will be necessary to strain the vessel liner. This can be achieved by the proper selection of materials and with proper design. It has been found that type 304 stainless steel will serve satisfactorily to give the type of strain capability needed. However, in permitting the strain of the vessel to effect complete expulsion, care should be taken to avoid the 0° portion of the liner from being stretched into the outlet 22 of the vessel and thereby stopping it. This can be accomplished by providing the outlet screen 26 hereinbefore mentioned. Moreover, with the liner offset to the upper edge of attachment band 30, it will not close off outlet 22 prior to complete expulsion of the fluid in the chamber.

Figure 3:
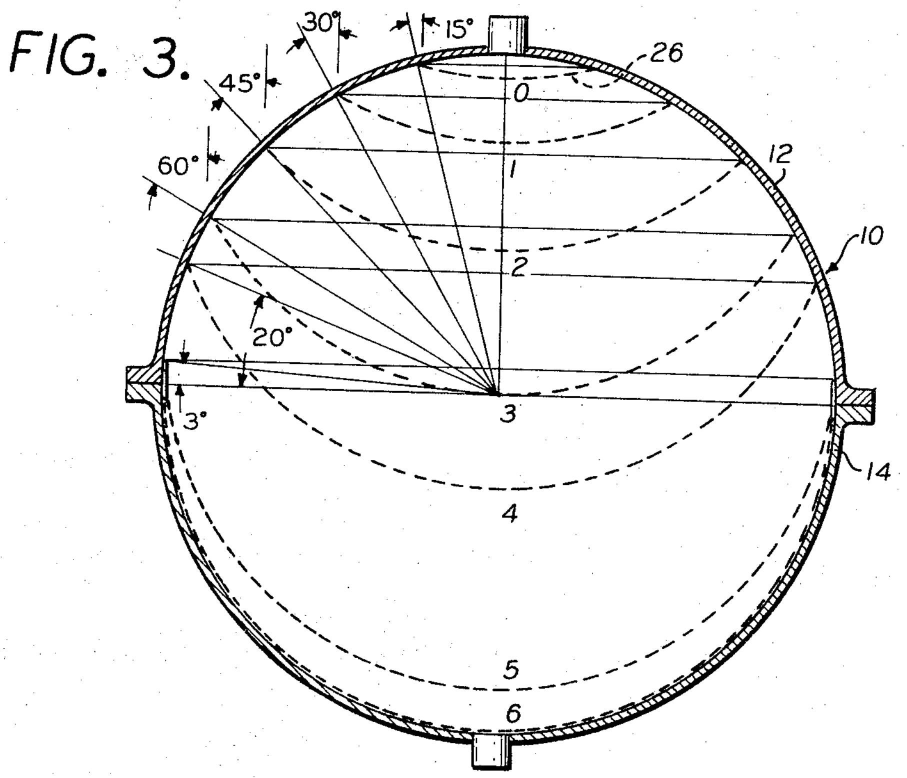
FIG. 3 is a schematic diagram illustrating a liner going through a line collapse type of movement.

As already noted the desirable form of collapse of the liner is a line collapse as illustrated in FIG. 3. However, during expulsion, the liner is exposed to differential external pressures and will develop compressive stresses which can cause uncontrolled buckling of the liner. Such uncontrolled buckling can lead the liner to an unpredictable collapse mode, thereby result in folding, creasing or the like, which is almost certain to cause perforation of the liner. Thus, it is necessary to prevent the uncontrolled buckling mode of collapse.

It can be established that the pressure differential for causing elastic buckling ($P_{cr}$) is given by the formula $$P_{cr}\ (\text{elastic})=KE\left(\frac{t}{R}\right)^2 \qquad (7)$$

where:

$P_{cr}$=critical buckling pressure, p.s.i.
$E$=Young's modulus, lbs./in.$^2$
$t$=thickness, in.
$K$=a constant (theoretically about .6; practical .2, although other value may be used).
$R$=radius, in.

For a sphere, K is generally taken to be .2. Applying the above equation for $P_{cr}$ to a sphere having a radius of 1.93 inches, a thickness of .005 inch and a Young's modulus of $30\times10^6$, it can be shown that $P_{cr}$ is equal to 40.4 p.s.i. If $P_{cr}$ as calculated for the above described liner is compared with the $P_y$ values given in the table hereinbefore set forth, it will be seen that for a uniformly thick hemispherical liner the critical pressure for uncontrolled buckling ($P_{cr}$) is much lower than the pressure necessary to yield an orderly line collapse ($P_y$), especially in the region close to the 0° point. Thus, such a hemispherical liner will invariably demonstrate uncontrolled collapse which is undesirable.

It can be shown that uncontrolled buckling of the liner is in the nature of buckling of a column. As can be demonstrated from a review of column formulas, the buckling pressure ($P_{cr}$) of a column is proportional to the moment of inertia of the column. Thus, if it is desired to increase $P_{cr}$ to a value which will exceed the $P_y$ for the liner, this can be achieved by increasing the moment of inertia of the liner itself. This can be done in a number of ways such as, for example, by corrugating the liner or by providing the liner with latitudinal reinforcing rings in spaced relation.

For example, assuming that the liner of the example hereinbefore discussed, namely that with a 1.93 inch radius and a .005 thickness, is to be corrugated with corrugations having an amplitude A and a half wave length L, the moment of inertia ($I_{sine}$) will be equal to $$I_{sine}=\int_0^L A^2 \sin^2\frac{\pi X}{L}t\,dx=\frac{A^2Lt}{2} \qquad (8)$$

Moreover, the moment of inertia of the same liner in uncorrugated condition ($I_{sheet}$) is given by the following formula $$I_{sheet}=\frac{I}{12}Lt^3 \qquad (9)$$

It can therefore be shown that the ratio of moments of inertia ($r$) is $$r=\frac{I_{sine}}{I_{sheet}}=\frac{A^2Lt/2}{Lt^{3/12}}=6\left(\frac{A}{t}\right)^2 \qquad (10)$$

As previously noted, the buckling pressure for uncontrolled buckling of the type of structure now being discussed ($P_{cr}$), is one of buckling under column action. The critical elastic buckling pressure for such a structure is given by the following formula $$P_{cr}=CE\left(\frac{t}{R}\right)^2 \qquad (11)$$

where C is a constant. It is clear that what is desired is to construct a liner having $P_{cr}$ greater than $P_y$ so that line collapse will occur and uncontrolled buckling will not occur. By corrugating the liner, $P_{cr}$ can be increased without increasing $P_y$, whereby to insure line collapse for the liner.

Let it be assumed that a desirable ratio between $P_{cr_{sin}}$ and $P_y$ is 3. But $$\frac{P_{cr_{sin}}}{P_{cr_{flat}}}\sim\frac{I_{sin}}{I_{flat}}=r \qquad (12)$$

Now substituting Equation 12 into the ratio $P_{cr}/P_y$ and solving for $r$, it can be shown that $$r=3\frac{P_y}{P_{cr_{flat}}}=3x\frac{87.2}{40.4}=6.5 \qquad (13)$$

Substituting this value of $r$ into Equation 10 above, and solving for A, the corrugation amplitude, for the illustrated liner having a thickness of .005 inch, it can be shown that $$\left(\frac{A}{t}\right)=r1/2=\sqrt{6.5}=2.55 \qquad (14)$$

and $A$=0.0125 in.

Moreover, in order to properly corrugate the liner, the corrugation length (2L) should be smaller than the diameter of a buckle which would occur in an unstiffened liner. This is normally about 5° of central angle. Thus for the illustrative liner, the corrugation half wave length L should be less than .084 inch and preferably less than .050 inch. In designing a corrugated liner which will yield a line collapse rather than an uncontrolled buckling it might be desirable to calculate the amplitude A of the liner.

This can be calculated by starting from the expression $$P_y<P_{cr} \qquad (15)$$

For a corrugated liner is has already been observed from Equation 12 that $$P_{cr_{sin}}=rP_{cr_{flat}} \qquad (16)$$

Substituting Equation 16 into Equation 15, it will be seen that $$P_y<rP_{cr_{flat}} \qquad (17)$$

Substituting Equation 6 for the left hand side of Equation 17 and Equations 10 and 7 for the right side of Equation 17 it will be seen that $$k\csc 2\alpha<6\left(\frac{A}{t}\right)^2KE\left(\frac{t}{R}\right)^2 \qquad (18)$$

Solving for A, it can be seen that $$A^2>\frac{k\csc 2\alpha R^2}{6KE} \qquad (19)$$

and $$A>R\sqrt{\frac{k\csc 2\alpha}{6KE}} \qquad (20)$$

wherein, as already noted, $R$=radius of the liner $$k=\frac{2\sigma_y}{\left(\frac{R}{t}\right)^{3/2}}$$

$\sigma_y$=the yield stress of the liner material
$t$=the thickness of the liner
$\alpha$=the central angle from the vertical at which the point under consideration is located (not less than about 3° nor more than 87°)
$K$=a constant (value between about .2 and .6); and
$E$=Young's modulus It will be recognized that other means of increasing the moment of inertia of the liner may be employed. Thus, in lieu of corrugating the liner, separate reinforcing means such as a plurality of latitudinally extending stiffening rings or a helically wound reinforcing member may be employed. Such separate reinforcing means may be affixed preferably to the outer surface of the liner, such as, for instance, by welding, soldering or the like, or a bladder could be machined or otherwise formed to provide such reinforcement. When a separate reinforcing member is secured to a liner or bladder it is presently preferred that the manner of securement yield a very short fillet so as to prevent any substantial thickening of the liner between turns of the reinforcement member. We have found and presently prefer to use a copper braze to effect such attachment when using stainless steel liner and reinforcement, especially when the brazing is performed at high temperatures in a vacuum. Gold braze is also satisfactory for securing stainless steel reinforcement to a stainless steel bladder or liner.

Figure 4:
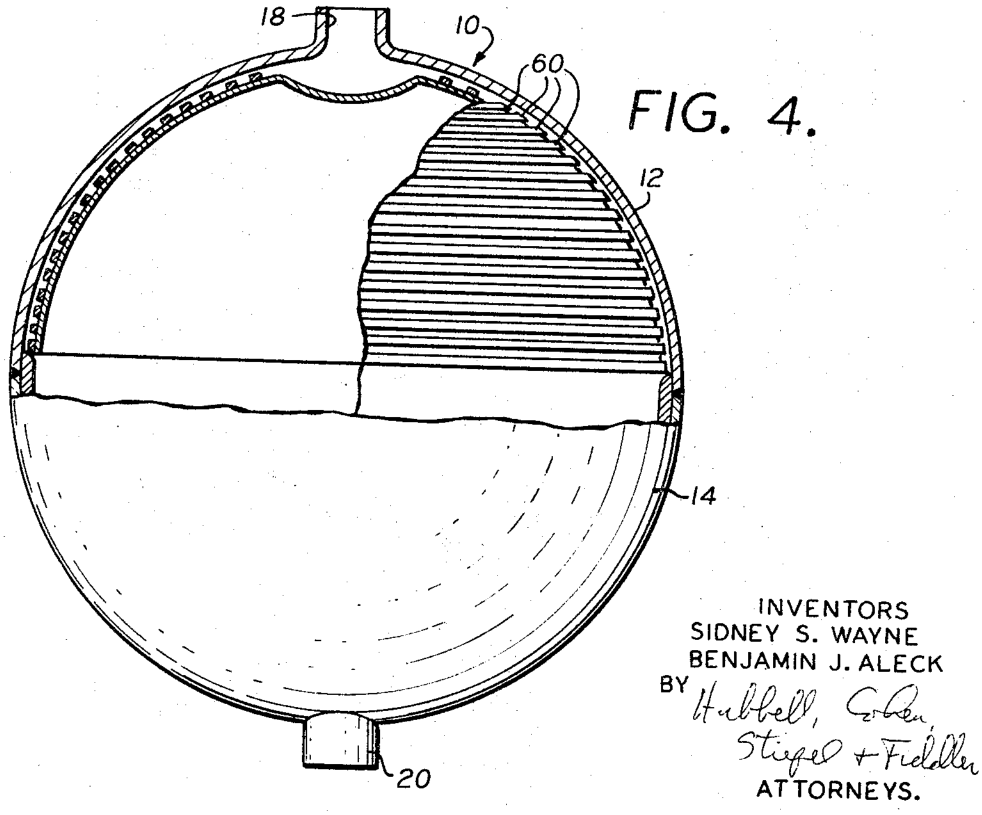
FIG. 4 is a view partly in elevation, partly in section, of a modified form of liner embodying the present invention.

A ring stiffener liner is shown in FIG. 4 in which the rings are designated by the reference numeral 60. Naturally the cross-sectional shape and area of the rings will affect the moment of inertia of the liner resulting from the rings being affixed thereto, and careful consideration of these parameters to assure a liner wherein $P_y$ is always less than $P_{cr}$ is necessary. Suffice it to say that such stiffening rings can take any desired cross-sectional shape such as a square, rectangle, circle, I, channel and so forth.

Figures 5, 6:
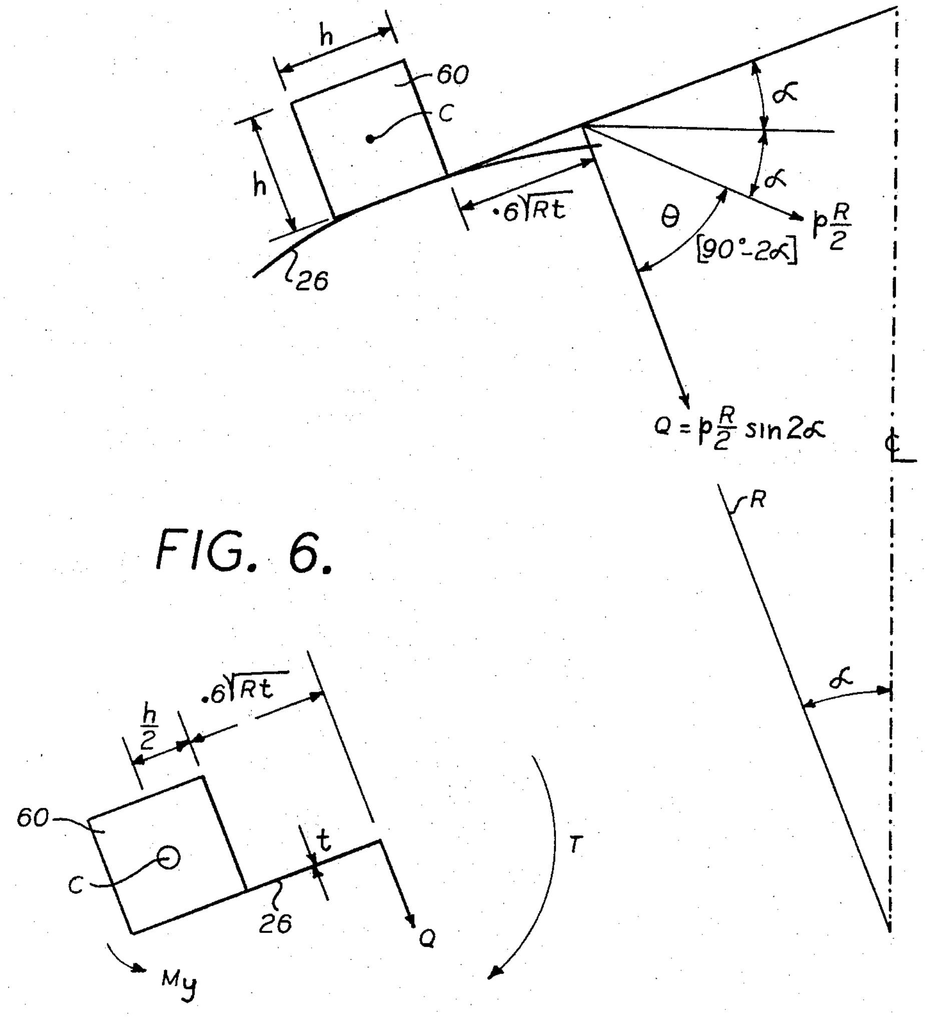
FIG. 5 is a schematic drawing of a segment of a reinforced liner illustrating the forces at work thereon.
FIG. 6 is a free body drawing of the segment of the liner shown in FIG. 5.

When stiffening rings 60 are affixed to a hemispherical liner of the type heretofore described (in lieu of corrugations as above discussed), consideration must be given not only to the pressure needed to effect line collapse through the liner 26 itself, but to the pressure needed to turn each stiffening ring 60 in on itself so as to permit collapse to continue in the line mode. In order to turn a stiffening ring in on itself, a torque must be applied to the stiffening ring. This torque is in the form of shear force Q resulting from the pressure differential applied to the liner. The casual observer would view the torque as a couple working directly on the sides of the stiffener ring itself. If this were the case, the actuation pressure required to effect the turning of the ring would probably be so large that almost invariably buckling would occur prior to such turning. However, more careful analysis indicates that the moment applied to the stiffener ring to turn it about its own centroid is the result of the shear force Q working through a stiff lever arm that is a short length of the liner itself, as illustrated in FIG. 5. It can be demonstrated that this lever arm is equal to $.6\sqrt{Rt}$ plus, of course, the distance from the edge of the reinforcement 60 to its centroid, $h/2$. With this being the case, the force Q needed to effect the turning through this sizeable lever arm is far less than the casual observer might have predicted. Hence, the actuation pressure needed to bring about the turning of the stiffener ring about its own centroid is considerably lower than expected and with proper design may be kept well below the buckling pressure of the liner.

In order to calculate the actuation pressure ($P_r$) necessary to turn a stiffener ring about its own centroid C, one must calculate the net torque acting on the stiffener. The net torque per inch of circumference is given by the expression $$T_{net}=Q\left[.6\sqrt{Rt}+\frac{h}{2}\right]-M_y \qquad (21)$$

wherein $M_y$ equals $\frac{1}{4}\sigma_y t^2$ $$Q=P_r\frac{R}{2}\sin 2\alpha$$

$\sigma_y$=the yield stress and
$t$=the thickness of the liner.

The bending moment of the ring ($M_R$) is given by the expression $$M_R=T_{net}R\sin\alpha \qquad (22)$$

The plastic resisting bending moment in the ring is given by the expression $$M_R=\frac{1}{4}\sigma_y h^3+.35\sigma_y Rt^2\sin\alpha \text{ or} \qquad (23)$$

$$M_R=\sigma_y Z \qquad (24)$$

Where Z is the modulus of rupture.
Substituting for both expressions, it can be shown $$\sigma_y\left[\frac{1/4h^3+.35Rt^2\sin\alpha}{R\sin\alpha}\right]= P_rR/2\sin 2\alpha[.6\sqrt{Rt}+h/2]-1/4\sigma_y t^2 \qquad (25)$$

$$\sigma_y\left[\frac{1/4h^3+.35Rt^2\sin\alpha}{R\sin\alpha}+1/4t^2\right]= P_rR/2\sin 2\alpha[.6\sqrt{Rt}+h/2] \qquad (26)$$

$$P_r=\frac{\sigma_y\left[\frac{1/4h^3+.35Rt^2\sin\alpha}{R\sin\alpha}+1/4t^2\right]}{R/2\sin 2\alpha[.6\sqrt{Rt}+h/2]} \qquad (27)$$

$$P_r=\frac{\sigma_y\left[\frac{1/4h^3}{R\sin\alpha}+.35t^2+1/4t^2\right]}{R/2\sin 2\alpha[.6\sqrt{Rt}+h/2} \qquad (28)$$

$$P_r=\frac{\sigma_y\left[\frac{1/4h^3}{R\sin\alpha}\right]+.6t^2}{R/2\sin 2\alpha[.6\sqrt{Rt}+h/2]} \qquad (29)$$

$$P_r=\frac{\sigma_y\left[1/4\frac{h^3}{R^3\sin\alpha}+.6\frac{t^2}{R^2}\right]}{\frac{\sin 2\alpha}{2R}[.6\sqrt{Rt}+h/2]} \qquad (30)$$

$$P_r=\frac{\sigma_y\left[\left(\frac{h}{R}\right)^3+2.4\left(\frac{t}{R}\right)^2\sin\alpha\right]}{\frac{2\sin\alpha\sin 2\alpha}{R}[.6\sqrt{Rt}+h/2]} \qquad (31)$$

In many instances, the small resistance afforded by the liner itself can be ignored in designing liners embodying the present invention. Such an approximation generally yields satisfactory results and simplifies calculations somewhat. The approximate formula is:

$$P_r=\frac{\sigma_y\left[\left(\frac{t}{R}\right)^2\sin\alpha+\left(\frac{h}{R}\right)^3\right]}{[\sin\alpha\sin 2\alpha]\left[1.2\sqrt{Rt}+\frac{h}{R}\right]} \qquad (31A)$$

Assuming for example that the liner shown in FIG. 5 has a thickness $t$ of .005″ and a radius R of 3″, that the width $h$ of the stiffening ring equals .04″ and that the yield stress $\sigma_y$ is 40,000 p.s.i., it can be shown that the actuation pressure ($P_r$) for turning the liner on itself at various liner locations is as follows:

| $\alpha$: | $P_r$ in p.s.i. |
|---|---|
| 20 | 13.3 |
| 30 | 8.46 |
| 45 | 6.42 |
| 60 | 6.92 |
| 75 | 11.7 |
| 80 | 17.0 |

It can be seen that as $\alpha$ approaches either 0° or 90°, the necessary actuation pressure for turning the ring $P_r$ rises abruptly. To overcome this problem in the zero degree region, the stiffener ring sizes may be diminished or, preferably, no stiffener rings should be applied at all for angles less than $\alpha$ equals about 20°. In the 90° region, the liner may be supported not at 90° but at a somewhat smaller angle, for example 80°, and thereby prevent rotation of the liner below that figure, or, in the alternative, the region may be supported on a flimsy cantilever so as to permit rotation of the liner at very low pressures. Another alternative is to permit the liner to take a conical form near the equator so that $\alpha$ is approximately 80°, as will be described more fully as this specification proceeds.

The immediately preceding discussion deals solely with the actuation pressure $P_r$ necessary for causing a stiffener ring to turn in on itself about its own centroid so as to permit line collapse through it. It will be obvious, in order to insure an overall line collapse of the stiffened liner, that the liner must be able to resist the actuation pressure. That is to say the liner must be able to withstand the actuation pressure without buckling. However, in discussing a stiffened liner utilizing stiffening rings rather than corrugations there are two types of liner buckling to be considered; the first being an overall buckling through the stiffener and the second being local buckling in between stiffeners. The buckling pressure of the unstiffened liner is given by Formula 7 on page 10 as $$P_{cr}=KE\left(\frac{t}{R}\right)^2$$

The buckling pressure through a ring alone is given by the expression $$P'_{cr}=\frac{3EI}{(R\sin\alpha)^3L}=1/4E\left(\frac{h}{R\sin\alpha}\right)^3\frac{h}{L} \qquad (32)$$

The overall pressure $P_0$ to buckle the reinforced liner is the sum of the buckling resistance of the unsupported liner $P_{cr}$ plus the buckling resistance of the ring $P'_{cr}$. In the example of the 3″ radius hemispherical liner reinforced with rings wherein $h=.04''$ and the thickness of the liner is .005″ and the yield strength of the liner is 40,000 p.s.i. it can be demonstrated that the buckling resistance of the unstiffened liner is 16.67 p.s.i., the buckling resistance of the rings $P'_{cr}$ are 7.62 p.s.i., whereby to yield an overall critical pressure $P_0$ of 24.29 p.s.i. which is considerably greater than the pressure needed to effect line collapse of the unstiffened liner and to effect a rolling of the stiffeners through their respective centroids. Thus, line collapse will be preserved.

As already noted, in addition to considering the problem of overall buckling of the stiffened liner, it is necessary to consider the problem of local buckling of the liner in between stiffeners. It can be shown that a good approximation of the critical pressure for buckling between stiffeners of a stiffened liner can be given by the formula $$P_{crs}=E\left(\frac{t}{R}\right)^2\frac{\sqrt{Rt}}{L} \qquad (33)$$

Thus by the proper selection of parameters local buckling can be avoided. In this connection consideration must be given to the dimension L which is the spacing between stiffeners. This spacing between stiffeners should not be less than $.6\sqrt{Rt}$ because if it is then so far as turning the liner about its centroid is concerned, the two closely spaced liners are connected as by a stiff member, and must be rotated together. This will sharply increase the required pressure $P_r$ for effecting such turning, which increase in pressure may result in uncontrolled buckling rather than line collapse. Spacing above $.6\sqrt{Rt}$ will eliminate this problem due to the fact that when the distance L is greater than $.6\sqrt{Rt}$ the liner will yield in line collapse until the line collapse reaches a distance from the stiffener that is equal to $.6\sqrt{Rt}$ at which point turning of the stiffener about its centroid will be effected through the liner increment $.6\sqrt{Rt}$ acting as a stiffened lever arm. It can be readily established that $P_r$ is always greater than $P_y$. Thus, one can readily calculate the maximum value of L to prevent local buckling between stiffeners by stating the fact that $$P_r<P_{crs} \qquad (34)$$

Substituting Equation 31 for the left hand side of Expression 34 and Equation 33 for the right hand side thereof, and solving for L, it can be seen that $$L<\frac{E\left(\frac{t}{R}\right)^2\sqrt{Rt}}{\dfrac{\sigma_y\left[\left(\frac{h}{R}\right)^3+2.4\left(\frac{t}{R}\right)^2\sin\alpha\right]}{\dfrac{2\sin\alpha\sin\alpha}{R}\left[.6\sqrt{Rt}+\frac{h}{2}\right]}} \qquad (35)$$

Figure 7:
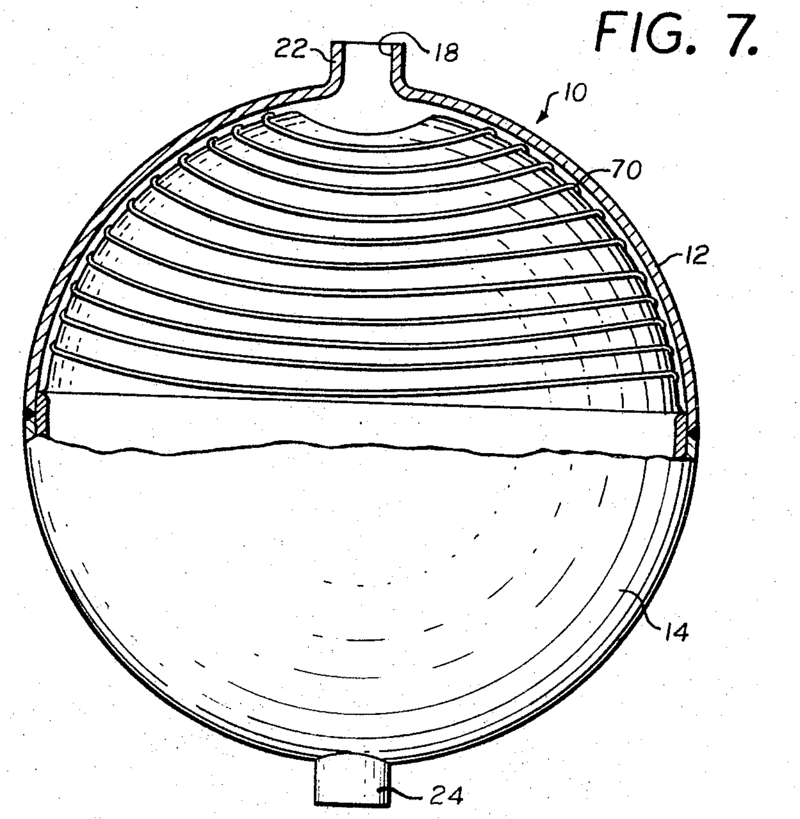
FIG. 7 is a view similar to FIG. 4 showing still another form of liner embodying the present invention.

Alternatively, a spiral stiffener having convolutions which are adapted to define a surface substantially identical to the outer surface of the liner may be affixed to the outer surface of the liner, as by welding, soldering, machining or the like, to serve as a means for increasing the stiffness of the liner to thereby increase the $P_{cr}$ of the liner in accordance with the above analysis. Such a form of liner is shown in FIG. 7 wherein the helical stiffening is designated by the reference numeral 70. The spacing of the convolutions of the stiffener 70 is determined by the same considerations as the spacing of the reinforcing rings. Accordingly, $$.6\sqrt{Rt}<L<\frac{E\left(\frac{t}{R}\right)^2\sqrt{Rt}}{\dfrac{\sigma_y\left[\left(\frac{h}{R}\right)^3+2.4\left(\frac{t}{R}\right)^2\sin\alpha\right]}{\dfrac{2\sin\alpha\sin 2\alpha}{R}\left[.6\sqrt{Rt}+\frac{h}{2}\right]}} \qquad (36)$$

The remaining parameters must be such that $P_y$ will always be less than $P_0$ (which is equal to $P_{cr}+P'_{cr}$), and $P_y$ will always be less than $P_{crs}$, as was true when separate reinforcing rings were employed. Again, as was true with the stiffening rings 60 described above, the cross-section of the stiffening helix 70 can be any desired shape yielding the necessary moment of inertia.

Armed with the foregoing information and analysis a reinforced collapsible liner can be designed utilizing empirical "cut-and-try" techniques. We have found that the best procedure for designing the liner is to first select a reinforcement spacing L which has some value greater than $.6\sqrt{Rt}$. We then arbitrarily select a convenient ring cross-section having a diameter or dimension $h$. Thereafter, the amount of inertia I for the ring cross-section plus the shell area $Lt$ is caluated. We then compute $P_0$ by utilizing Equations 7 and 36. Then we calculate the actuation pressure $P_r$ necessary to turn a stiffener ring about its own centroid by applying Equation 31. We then check to see that the resistance to overall buckling $P_0$ is greater than the actuation pressure $P_r$ and we also check to determine the correctness of the statement set forth in Equation 36.

If we find that the spacing is too large we reduce it to a reasonable value in accordance with the inequality of Equation 36. If $P_r$ is greater than $P_0$ empirical corrections in the design parameters are made and the entire design is recalculated as above set forth until it has been determined that $P_0$ is greater than $P_r$ and that statement (36) is satisfied. For the best design the smallest $h$ and the largest L which satisfy the above set forth design criteria are chosen.

Figure 8:
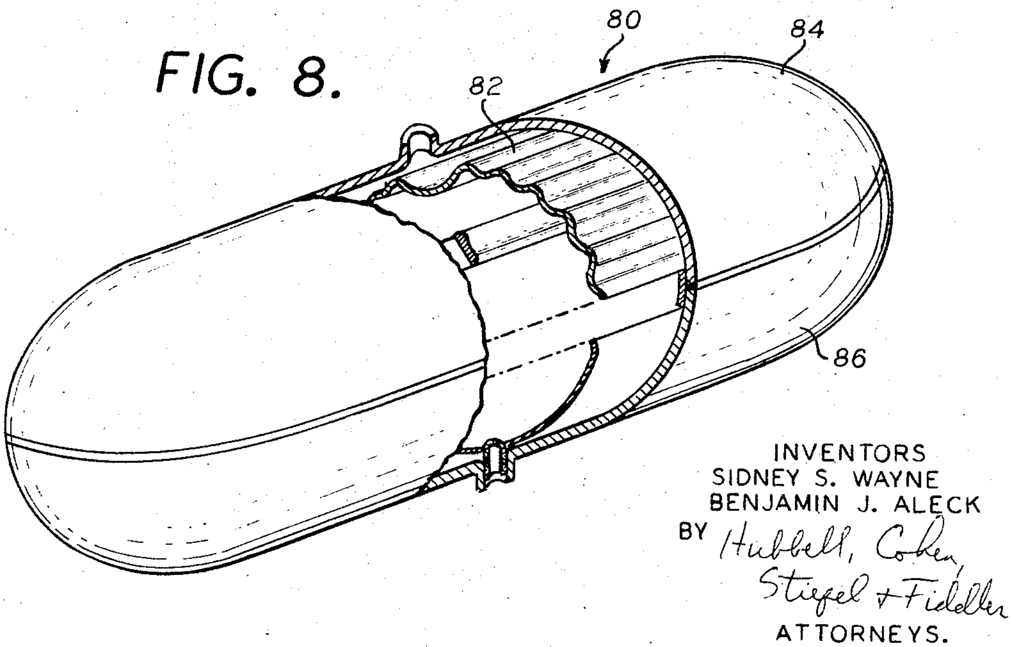
FIG. 8 is a view partly in broken away perspective and partly in section showing a modified form of storage and expulsion system embodying the present invention.

It will also be recognized that the present invention is not limited to spherical liners as above described. For example, a semicylindrical liner may be used in conjunction with a cylindrical vessel in order to serve as storage in an evacuating system. Such a cylindrical vessel is shown in FIG. 8 and designated by the reference numeral 80 having a semicylindrical liner 82 therein. It will be clear that the semicylindrical liner in the uncollapsed position shown in solid lines conforms generally with the upper semicylinder 84 whereas when the liner is fully collapsed, as shown in dotted lines in the drawing, it conforms with the lower semicylinder 86. The liner may take any of the described forms, corrugated, stiffened with latitudinal rings or with a helix, so that it will exhibit line collapse rather than uncontrolled buckling. As shown, liner 82 is corrugated. As is true with the spherical system, liner 82 may be provided with a dimple-like groove in its polar region and is preferably connected to the vessel a short distance above the diametral plane.

Figures 9, 10:
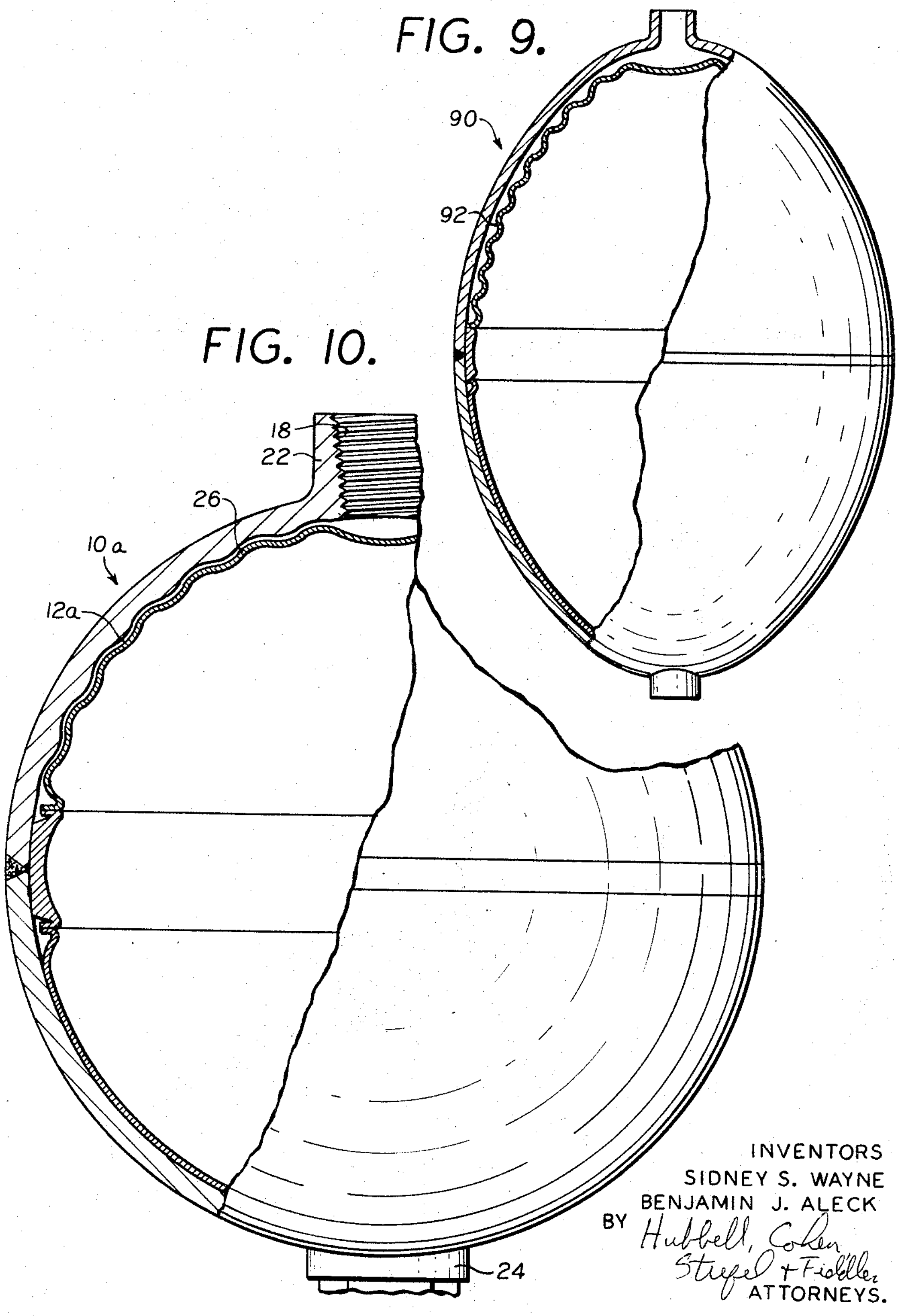
FIG. 9 is a view similar to FIG. 1 showing still another modification of the present invention.
FIG. 10 is a view similar to FIG. 1 showing still another modification.

Alternatively an ellipsoidal storage vessel having a semi-ellipsoidal collapsible liner therewithin may be employed in accordance with the teachings of the present invention. Such a vessel is shown in FIG. 9 herein, the vessel itself being designated by the reference numeral 90. Again, the resistance to buckling of the semi-ellipsoidal liner 92 may be increased by corrugating or other stiffening means in order to assure that the pressure necessary to cause uncontrolled buckling is greater than the pressure necessary to create a line collapse action. In addition, the actuation pressure for line collapse can be reduced in the polar and equatorial regions by means of a dimple and offset connection, respectively.

Regardless of the form of the vessel and liner consideration must be made to certain other details of this invention in order to yield a wholly desirable system. For example, if a corrugated liner is employed and fluid is stored within the vessel under pressure, the pressure may be sufficient to cause yielding of the liner whereby to eliminate the corrugations. The loss of the corrugations will sharply decrease the pressure necessary to yield uncontrolled buckling ($P_{cr}$) whereby to give rise to the danger of such action taken place during fluid expulsion. In order to avoid such an occurrence the interior surface of the vessel (for example, surface 12*a* of vessel 10*a* of FIG. 8) can be contoured to be complementary to the corrugations of the liner 26 so as to prevent such yielding during storage under pressure.

Figures 11, 12, 13:
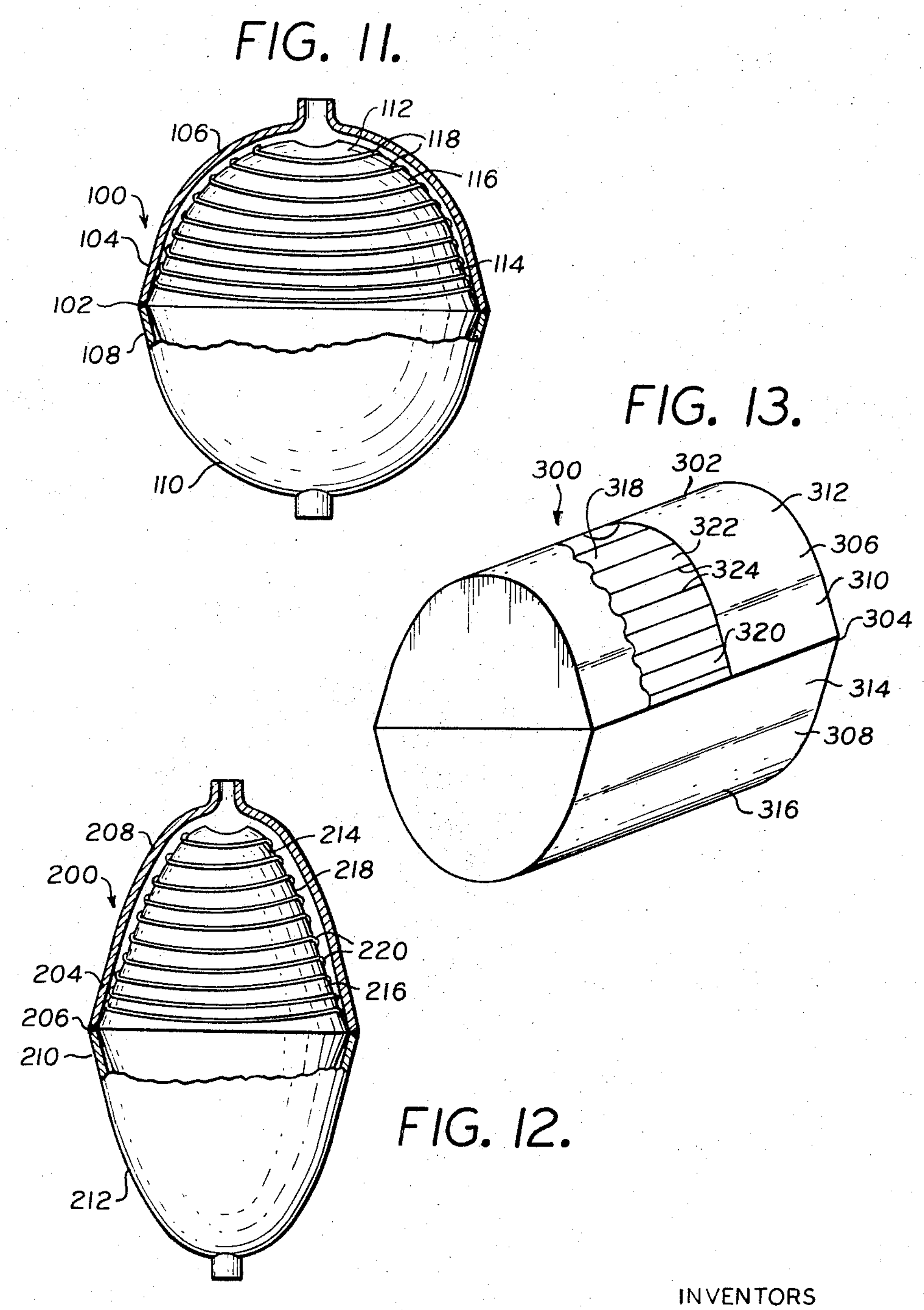
FIG. 11 is a view similar to FIG. 1 showing still another form of the present invention.
FIG. 12 illustrates yet a further modification of the present invention.
FIG. 13 is a view similar to FIG. 1 showing still another modification of the present invention.

Other means may be employed to reduce $P_y$ and $P_r$ near the diametral or median plane of the vessel which value normally goes up in the 90° area as above mentioned. In lieu of securing the liner in a plane offset from the diametral or median plane the liner and conatiner can be shaped so as to intersect the median plane at other than 90°. For example, a spherical container can be modified so that the portions immediately to either side of the diametral or median plane can be frustoconical in shape with the remainder of the bladder and the remainders of the container being spherical segments. Such a modified form of expulsion container bladder system is shown in FIG. 11 and designated with the reference numeral 100. Immediately adjacent the diametral plane of the container 100, that is the plane 102, is an upwardly extending frustoconical section 104 which merges into a spherical segment 106. Immediately below the diametral plane 102 is a frustoconical section 108 which merges into a spherical segment 110. The extent of the frustoconical sections 104 and 108 need not exceed 15° of central angle although of course a large central angle may be employed. With such a configuration for the container the collapsible liner 112 can be shaped substantially the same, that is with a frustoconical section 114 adjacent the diametral plane 102 and a spherical segment section 116 in the polar region. The liner may be reinforced as by reinforcing rings 118 shown in FIG. 11 or it may be corrugated or otherwise stiffened to resist uncontrolled buckling. The liner may be provided with a small dimple in its polar region. With such a construction the liner 114 can be secured to the inner surface of the container at the diametral plane 102 rather than offset therefrom.

A similar expedient can be employed in connection with an ellipsoidal container illustrated in FIG. 12 and designated therein by the reference numeral 200. A true ellipsoidal container can be modified to provide it with a frustoconical section 204 adjacent the diametral plane 206 and an ellipsoidal segment 208 remote therefrom. On the other side of the diametral plane the container may be provided with a frustoconical section 210 adjacent the diametral plane 206 and an ellipsoidal segment portion 212 remote from the plane. A collapsible liner

214 secured to the container 200 at the diametral plane 206 is similarly shaped, that is, with frustoconical section 216 adjacent the diametral plane 206 and an ellipsoidal segment section 218 remote from the plane. As shown in FIG. 12 the collapsible liner is stiffened against uncontrolled buckling by reinforcing rings 220 although a reinforcing helix or corrugations may be employed. The liner is provided with a polar dimple.

The same expedient can be employed with respect to other shapes. For example, in FIG. 13, a modified cylindrical expulsion system 300 is shown wherein the cylindrical container 302 has a diametral plane 304 with upper and lower portions 306 and 308. The upper portion 306 has two sections, a section 310 adjacent the diametral plane and a section 312 remote therefrom. The section 310 is planar and defines a wedge which runs smoothly into cylindrical segment section 312. The lower portion of the modified cylinder 308 has a wedge portion 314 adjacent the diametral plane 304 and a cylindrical segment section 316 remote therefrom. The liner 318 is similarly shaped to the upper or lower portion of the modified cylinder. That is it has a wedge shaped portion 320 adjacent the diametral plane 304 to which it is connected and a cylindrical segment portion 322 in the polar regions of the liner. As shown the liner 318 is stiffened against uncontrolled buckling as by stiffening rings 324 although a stiffening helix, corrugations or other means may be employed. A polar dimple or groove is provided in the liner to enable line collapse in that region.

While we have herein shown and described the preferred form of the present invention and have suggested various modifications therein other changes and modifications may be made therein within the scope of the appended claims without departing from the spirit and scope of the invention.

What is claimed is:

1. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, and means on said liner for rendering said liner more resistant to uncontrolled buckling than to flexural yielding, whereby to prevent said liner from uncontrolledly buckling and to cause said liner to collapse in an orderly fashion by flexural yielding.

2. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on one side of said plane, means for connecting said liner to the interior of said container in sealed relation therewith adjacent to but on said one side of said diametral plane, and means on said liner for rendering said liner more resistant to uncontrolled buckling than to flexural yielding, whereby to prevent said liner from uncontrolledly buckling and to cause said liner to collapse in an orderly fashion by flexural yielding.

3. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, the portion of said liner most remote from said diametral plane having a depression therein directed toward said plane, and means on said liner for rendering said liner more resistant to uncontrolled buckling than to flexural yielding, whereby to prevent said liner from uncontrolledly buckling and to cause said liner to collapse in an orderly fashion by flexural yielding.

4. A storage-expulsion system having a container which is substantially symmetrical about a diametral plane, inlet means for said container on one side of said plane, outlet means for said container on the other side of said plane, a collapsible metal liner means conforming substantially to the interior surface of the portion of said container on said one side of said plane, means for connecting said liner to the interior of said container in sealed relation therewith adjacent to but on said one side of said diametral plane, the portion of said liner most remote from said diametral plane having a depression therein directed toward said plane, and means on said liner for rendering said liner more resistant to uncontrolled buckling than to flexural yielding, whereby to prevent said liner from uncontrolledly buckling and to cause said liner to collapse in an orderly fashion by flexural yielding.

5. A storage-expulsion system having a container which is substantially symmetrical about a diametral plane, inlet means for said container on one side of said plane, outlet means for said container on the other side of said plane, a collapsible metal liner means conforming substantially to the interior surface of the portion of said container on said one side of said plane, said liner being corrugated to render said liner more resistant to uncontrolled buckling than to flexural yielding, whereby to prevent said liner from uncontrolledly buckling and to cause said liner to collapse in an orderly fashion by flexural yielding.

6. A storage-expulsion system having a container which is substantially symmetrical about a diametral plane, inlet means for said container on one side of said plane, outlet means for said container on the other side of said plane, a collapsible metal liner means conforming substantially to the interior surface of the portion of said container on said one side of said plane, said liner being corrugated, the corrugations of said liner extending latitudinally having a wave length not exceeding the liner circumferential distance intercepted by about 5° of central angle and an amplitude defined by the expression $$A > R\sqrt{\frac{k\csc 2\alpha}{6KE}}$$

wherein
$R$=radius of liner $$k=\frac{2\sigma_y}{\left(\frac{R}{t}\right)^{3/2}}$$

$\sigma_y$=yield stress of liner
$t$=liner thickness
$\alpha$=the central angle at which a given point under consideration is located from the polar axis (not less than about 3° nor more than about 87°).
$K$=constant (value between about .2 and .6).
$E$=Young's modulus.

7. A storage-expulsion system having a container which is substantially symmetrical about a diametral plane, inlet means for said container on one side of said plane, outlet means for said container on the other side of said plane; a collapsible metal liner means conforming substantially to the interior suface of the portion of said container on one side of said plane, means for connecting said liner to the interior of said container in sealed relation therewith adjacent to but on said one side of said diametral plane, the portion of said liner most remote from said diametral plane having a depression therein directed toward said plane, the remainder of said liner being corrugated, the corrugations of said liner extending latitudinally having a wave length not exceeding the liner circumferential distance intercepted by about 5° of central angle and an amplitude defined by the expression $$A > R\sqrt{\frac{k\csc 2\alpha}{6KE}}$$

wherein
$R$=radius of liner $$k=\frac{2\sigma_y}{\left(\frac{R}{t}\right)^{3/2}}$$

$\sigma_y$=yield stress of liner
$t$=liner thickness
$\alpha$=the central angle at which a given point under consideration is located from the polar axis (not less than about 3° nor more than about 87°).
$K$=constant (value between about .2 and .6).
$E$=Young's modulus.

8. The device defined in claim 7, wherein said container is substantially spherical and the liner is metallic.

9. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, and latitudinally extending spaced apart turns of reinforcement on said liner, said turns of reinforcement being meridianally spaced apart by a distance (L) defined by the expression $$.6\sqrt{Rt} < L < \frac{E\left(\frac{t}{R}\right)^2\sqrt{Rt}}{\sigma_y\left[\left(\frac{h}{R}\right)^3+2.4\left(\frac{t}{R}\right)^2\sin\alpha\right]-\frac{2\sin\alpha\sin 2\alpha}{R}\left[.6\sqrt{Rt}+\frac{h}{2}\right]}$$

wherein:
$R$=radius of liner
$h$=twice the distance from the transverse edge of the reinforcement to its centroid
$t$=thickness of liner
$E$=Young's modulus $$K=\frac{2\sigma_y}{\left(\frac{R}{t}\right)^{3/2}}$$

$\sigma_y$=yield stress of liner
$\alpha$=the central angle at which a given point is located from the polar axis (not less than about 20° nor more than about 80°), whereby said reinforced liner has an overall uncontrolled buckling pressure ($P_o$) which is greater than the pressure necessary for turning a reinforcement turn about its centroid ($P_r$), and the local buckling pressure between said reinforcement turns ($P_{crs}$) is greater than the pressure necessary to turn said reinforcement about its centroid ($P_r$).

10. The device of claim 9, wherein said reinforcement comprises a plurality of separate reinforcement rings.

11. The device of claim 9, wherein said reinforcement comprises a helical member having a plurality of spaced apart convolutions.

12. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, means for connecting said liner to the interior of said container in sealed relation therewith adjacent to but on said one side of said diametral plane, the portion of said liner most remote from said diametral plane having a depression therein directed toward said plane, and latitudinally extending spaced apart turns of reinforcement secured to the remainder of the surface of said liner, said turns of reinforcement being meridianally spaced apart by a distance (L) defined by the expression $$.6\sqrt{Rt}<L<\frac{E\left(\frac{t}{R}\right)^2\sqrt{Rt}}{\dfrac{\sigma_y\left[\left(\frac{h}{R}\right)^3+2.4\left(\frac{t}{R}\right)^2\sin\alpha\right]}{\dfrac{2\sin\alpha\sin 2\alpha}{R}\left[.6\sqrt{Rt}+\frac{h}{2}\right]}}$$

wherein:

$R$=radius of liner $t$=thickness of liner $h$=twice the distance from the transverse edge of the reinforcement to its centroid.

$E$=Young's modulus.

$$K=\frac{2\sigma_y}{\left(\frac{R}{t}\right)^{3/2}}$$

$\sigma_y$=yield stress of liner.

$\alpha$=the central angle at which a given point is located from the polar axis (not less than about 20° nor more than about 80°), whereby said reinforced liner has an overall uncontrolled buckling pressure ($P_0$) which is greater than the pressure required for turning a reinforcement about its centroid ($P_r$), and the local buckling pressure between said reinforcement turns ($P_{crs}$) is greater than the pressure necessary to effect the turning of the reinforcement about its centroid ($P_r$).

13. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, means on said liner for rendering said liner more resistant to uncontrolled buckling than to flexural yielding, whereby to prevent said liner from uncontrolledly buckling and to cause said liner to collapse in an orderly fashion by flexural yielding, and means for connecting said liner to said container substantially at said diametral plane, said liner having a substantially frustoconical shaped portion adjacent said diametral plane, substantially all of the remainder of said liner being shaped substantially as a spherical segment.

14. A storage-expulsion system having a container which is substantially symmetrical about a diametral plane, inlet means for said container on one side of said plane, outlet means for said container on the other side of said plane, a collapsible metal liner means conforming substantially to the interior surface of the portion of said container on said one side of said plane, means on said liner for rendering said liner more resistant to uncontrolled buckling than to flexural yielding, whereby to prevent said liner from uncontrolledly buckling and to cause said liner to collapse in an orderly fashion by flexural yielding, and means for connecting said liner to said container and substantially at said diametral plane, said liner having a portion adjacent said diametral plane of substantially the shape of the frustum of a wedge, substantially all of the remainder of said liner being shaped as a cylindrical segment.

15. A storage-expulsion system having a container which is substantially symmetrical about a diametral plane, inlet means for said container on one side of said plane, outlet means for said container on the other side of said plane; a collapsible metal liner means conforming substantially to the interior surface of the portion of said container on said one side of said plane, means on said liner for rendering said liner more resistant to uncontrolled buckling than to flexural yielding, whereby to prevent said liner from uncontrolledly buckling and to cause said liner to collapse in an orderly fashion by flexural yielding, and means for connecting said liner to said container substantially at said diametral plane, said liner having a substantially frustoconical shaped portion adjacent said diametral plane, substantially all of the remainder of said liner being shaped substantially as an ellipsoidal segment.

16. The storage-expulsion system of claim 1 wherein said last mentioned means comprises a plurality of latitudinally extending turns of reinforcement separate from said liner and means for securing said reinforcement to said liner.

17. The storage-expulsion system of claim 16, wherein said liner and reinforcement are of stainless steel and said means for securing said reinforcement to said liner is a braze selected from the class consisting of copper braze and gold braze.

References Cited

UNITED STATES PATENTS

| | | | |
|---|---|---|---|
| 2,387,598 | 10/1945 | Mercier | 222—95 X |
| 3,027,044 | 3/1962 | Winstead | 220—63 |
| 3,143,429 | 8/1964 | Swanson et al. | 222—215 X |
| 3,197,087 | 7/1965 | Black | 222—386.5 |
| 3,213,913 | 10/1965 | Petriello | 222—95 X |

ROBERT B. REEVES, *Primary Examiner.*

N. L. STACK, *Assistant Examiner.*

UNITED STATES PATENT OFFICE

CERTIFICATE OF CORRECTION

Patent No. 3,339,803 September 5, 1967

Sidney S. Wayne et al.

It is hereby certified that error appears in the above numbered patent requiring correction and that the said Letters Patent should read as corrected below.

Column 1, line 14, for "the out" read -- the fluid out --; column 2, line 25, for "as" read -- has --; column 3, line 9, for "accumed" read -- assumed --; lines 27 to 29, for that portion of formula (2) reading "$3(1-\nu_2)$" read -- $3(1-\nu^2)$ --; column 11, line 28, for "taken" read -- taking --; column 14, line 16, strike out "and the liner is metallic"; column 16, line 34, for "liner" read -- liner, --.

Signed and sealed this 24th day of December 1968.

(SEAL)
Attest:

Edward M. Fletcher, Jr.
Attesting Officer

EDWARD J. BRENNER
Commissioner of Patents